(12) United States Patent
Oberle

(10) Patent No.: US 10,318,402 B2
(45) Date of Patent: Jun. 11, 2019

(54) AUTOMATED SOFTWARE COMPLIANCE ANALYSIS

(71) Applicant: SAP SE, Walldorf (DE)

(72) Inventor: Daniel Oberle, Durmersheim (DE)

(73) Assignee: SAP SE, Walldorf (DE)

( * ) Notice: Subject to any disclaimer, the term of this patent is extended or adjusted under 35 U.S.C. 154(b) by 210 days.

(21) Appl. No.: 15/364,216

(22) Filed: Nov. 29, 2016

(65) Prior Publication Data

US 2018/0150377 A1    May 31, 2018

(51) Int. Cl.
*G06F 9/44* (2018.01)
*G06F 11/36* (2006.01)

(52) U.S. Cl.
CPC ...... *G06F 11/3608* (2013.01); *G06F 11/3604* (2013.01)

(58) Field of Classification Search
CPC ........................................................ G06F 9/44
USPC ................................................ 717/126–128
See application file for complete search history.

(56) References Cited

U.S. PATENT DOCUMENTS

| | | | |
|---|---|---|---|
| 7,383,326 B1* | 6/2008 | Himberger | H04L 67/34 709/203 |
| 8,078,568 B2 | 12/2011 | Stuhec et al. | |
| 8,621,649 B1* | 12/2013 | Van Dijk | H04L 29/06 713/150 |
| 8,768,923 B2 | 7/2014 | Drumm et al. | |
| 8,799,207 B1* | 8/2014 | Stolte | G06F 17/30592 706/46 |
| 9,158,522 B2 | 10/2015 | Nyisztor et al. | |
| 9,171,060 B2 | 10/2015 | Oberle et al. | |
| 9,258,668 B2 | 2/2016 | Mall et al. | |
| 9,344,833 B2 | 5/2016 | Nyisztor et al. | |
| 2004/0167985 A1* | 8/2004 | Jamitzky | H04L 69/16 709/230 |
| 2004/0181533 A1* | 9/2004 | Santosuosso | G06F 17/3056 |
| 2006/0031672 A1* | 2/2006 | Soltis, Jr. | G06F 12/1491 713/164 |
| 2006/0036997 A1* | 2/2006 | Low | G06F 8/20 717/113 |
| 2006/0090130 A1* | 4/2006 | Bent | G06F 17/227 715/273 |
| 2007/0288250 A1 | 12/2007 | Lemcke et al. | |
| 2008/0319937 A1 | 12/2008 | Stuhec et al. | |
| 2009/0202964 A1* | 8/2009 | Simon | G06Q 10/10 434/62 |

(Continued)

OTHER PUBLICATIONS

Oberle, et al., "An Ontology for Software," 20 pages, 2009. [https://userpages.unikoblenz.de/~staab/Research/Publications/2009/handbookEdition2/ontology-for-software.pdf], visited on or before Oct. 24, 2016.

(Continued)

*Primary Examiner* — Jae U Jeon
(74) *Attorney, Agent, or Firm* — Klarquist Sparkman, LLP

(57) ABSTRACT

A plurality of data sources accessed by a software program are automatically determined by a compliance tool. At least a portion of the data sources are automatically associated with one or more formalized compliance terms using the compliance tool. At least a portion of the data sources is analyzed by the compliance tool using at least one formalized compliance norm that include at least one of the one or more formalized compliance terms to provide compliance results. The compliance results are output to a user.

20 Claims, 11 Drawing Sheets

(56) References Cited

U.S. PATENT DOCUMENTS

| | | | |
|---|---|---|---|
| 2010/0031240 | A1 | 2/2010 | Drumm et al. |
| 2010/0323786 | A1* | 12/2010 | Smith .................. G07F 17/32 463/25 |
| 2011/0078215 | A1 | 3/2011 | Oberle et al. |
| 2013/0054721 | A1* | 2/2013 | Caden .................. G06Q 50/00 709/206 |
| 2014/0280370 | A1 | 9/2014 | Oberle et al. |
| 2014/0282831 | A1* | 9/2014 | Pedroza .................. H04L 63/20 726/1 |
| 2016/0034538 | A1 | 2/2016 | Oberle |

OTHER PUBLICATIONS

Oberle, et al., "Engineering Compliant Software: Advising Developers by Automatic Legal Reasoning," *SCRIPTed*, vol. 9, No. 2, 35 pages, 2012.

Oberle, "Ontologies and Reasoning in Enterprise Service Ecosystems," *Informatik Spektrum*, vol. 37, No. 4, 13 pages, 2014.

Oberle, et al., "Towards Ontologies for Formalizing Modularization and Communication in Large Software Systems," 48 pages, Sep. 23, 2005. [http://lambda.csail.mit.edu/~chet/papers/others/o/oberle/joao2005.pdf], visited on or before Oct. 24, 2016.

Raabe, et al., "Recht ex Machina: Formalisierung des Rechts im Internet der Dienste," 476 pages, 2012.

SAP, "Administrator, SAP Mobile Platform 3.0 SP02," *SAP AG*, 414 pages, 2014.

SAP, "AppBuilder, AppBuilder 1.0," *SAP AG*, 244 pages, 2013.

SAP, "Application Configuration Profile Directory and Contents," SAP SE, 3 pages, 2016. [http://help.sap.com/saphelp_smp303sdk/helpdata/en/34/af827c992a438293cd3150f2db43bd/content.htm], visited on or before Oct. 24, 2016.

SAP, "Application Configuration Profile Project," *SAP SE*, 3 pages, 2016. [http://help.sap.com/saphelp_smp3012sdk/helpdata/en/7c/0718b7700610148e59f99035fb7035/content.htm].

SAP, "Building MAF Core," 3 pages, 2016. [http://help.sap.com/saphelp_smp3010sdk/helpdata/en/7c/08c979700610149ae3e44c8d06d541/content.htm], visited on or before Oct. 24, 2016.

SAP, "Data Component," *SAP SE*, 3 pages, 2016. [http://help.sap.com/saphelp_smp303sdk/helpdata/en/7c/08fc63700610148b71a26562fb4cb7/content.htm], visited on or before Oct. 24, 2016.

SAP, "Data Layer," *SAP SE*, 3 pages, 2016. [http://help.sap.com/saphelp_smp303sdk/helpdata/en/7c/08f7eb700610149dcc8d1ccc54129f/content.htm], visited on or before Oct. 24, 2016.

SAP, "Data Source Adaptor," *SAP SE*, 3 pages, 2016. [http://help.sap.com/saphelp_smp303sdk/helpdata/en/6e/7f1f316dfc4d75bdc7b45cb740d63f/content.htm], visited on or before Oct. 24, 2016.

SAP, "Developing with the Android Extensibility Framework," *SAP SE*, 34 pages, 2016. [http://help.sap.com/saphelp_smp3010sdk/helpdata/en/7c/08847970061014856ad2a097bfde0a/content.htm], visited on or before Oct. 24, 2016.

SAP, "Extensibility Configuration Management," *SAP SE*, 4 pages, 2016. [http://help.sap.com/saphelp_smp303sdk/helpdata/en/3f/678e44e9284056870c571540742499/content.htm], visited on or before Oct. 24, 2016.

SAP, "Extensibility Layout XML," *SAP SE*, 11 pages, 2016. [http://help.sap.com/saphelp_smp303sdk/helpdata/en/0a/bfb414bcac4648a8e577cedcb185c8/content.htm], visited on or before Oct. 24, 2016.

SAP, "Generic Business Object," *SAP SE*, 3 pages, 2016. [http://help.sap.com/saphelp_smp303sdk/helpdata/en/b0/182418e78646e09d0d91bf878300f5/content.htm], visited on or before Oct. 24, 2016.

SAP, "Mobile Application Workbench, SAP Mobile Platform 3.0," *SAP AG*, 30 pages, 2013.

SAP, "SMS Application Development, SAP Mobile Platform 3.0," *SAP AG*, 278 pages, 2013.

SAP, "Uploading Configuration Profiles," SAP SE, 3 pages, 2016. [http://help.sap.com/saphelp_smp303sdk/helpdata/en/d9/4fc953a2074d0a85f5f3145126fa55/content.htm], visited on or before Oct. 24, 2016.

SAP, "Using the MAF Extensibility Framework in Passive Mode." *SAP SE*, 3 pages, 2016. [http://help.sap.com/saphelp_smp3010sdk/helpdata/en/7c/08ea5b70061014aca6accc9cc94541/content.htm], visited on or before Oct. 24, 2016.

* cited by examiner

AUTOMATED SOFTWARE COMPLIANCE ANALYSIS

FIELD

The present disclosure generally relates to analyzing software programs for compliance issues. Particular implementations relate to analyzing data sources associated with the software program to determine if they raise a compliance issue associated with a formalized compliance norm.

BACKGROUND

Society is becoming ever more data driven. Companies are able to track their operations at increasing levels of granularity. For individuals, as more and more of their activity takes place, or is tracked, in the digital world, their personal information is often recorded, used, shared, and sold. Even discounting nefarious activities such as hacking, phishing, malware, and viruses, a tremendous amount of information regarding individuals can be gathered through sources such as the websites an individual visits, their actions on the websites, and activity on social networks. Information stored by companies, such as banks, medical providers, and employers, can also be sensitive.

Individuals and governments are increasingly sensitive to the collection and use of personal information. Various laws have been passed to try and specify what information about an individual can be collected, how it can be collected, and how it can be used, shared, or sold. While such laws can be beneficial for individuals, it can be difficult for companies, and particularly the individuals working at companies, to be aware of all the various laws and regulations that might apply to their activities. Even if a company or employee is aware of a law or regulation, laws and regulations can be difficult to understand, and their ramifications may not be clear without additional context. Thus, even companies and employees wishing to comply with relevant laws and regulations regarding the use of personal information may find it difficult to determine whether their actions, or proposed actions, will be legally compliant.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for facilitating the determination of whether a software program may raise a compliance issue, such as whether data sources associated with the software program include protected information. According to a particular method, a plurality of data sources accessed by a software program are automatically determined with a compliance tool. At least a portion of the data sources are associated with one or more formalized compliance terms. At least a portion of the data sources are analyzed with the compliance tool using at least one formalized compliance norm comprising at least one of the one or more formalized compliance terms, providing compliance results. The compliance results are output to a user. In some cases, the output can include a visual representation of the formalized compliance norm and associated formalized compliance terms, and the visual representation can indicate formalized compliance terms that may be associated with a potential compliance issue.

According to another method, a method of a software authoring tool is called to determine user interface controls associated with a software application. Methods associated with the user interface controls are called to determine data sources associated with the user interface controls. At least a portion of the data sources are associated with one or more formalized compliance terms. At least a portion of the data sources are analyzed using at least one formalized compliance norm comprising at least one of the one or more formalized compliance terms. A visual representation of the formalized compliance norm and associated formalized compliance terms is output for display. The visual representation indicates formalized compliance terms that may be associated with a potential compliance issue.

In a further method, a configuration file of a software application is analyzed for data binding information. The data binding information indicates at least one data source accessed by the software application. At least a portion of the data sources are associated with one or more formalized compliance terms. At least a portion of the data sources are analyzed using a formalized compliance norm comprising at least one of the one or more formalized compliance terms. A visual representation of the formalized compliance norm and associated formalized compliance terms is output for display. The visual representation indicates formalized compliance terms that may be associated with a potential compliance issue.

In another method, a configuration file of a software application is analyzed for data binding information. The data binding information indicates at least one data source accessed by the software application. The at least one data source is compared with a library or list of data sources. In a particular implementation, if the at least one data source is in the library, a potential compliance issue is indicated. In another implementation, if the at least one data source is not in the library, a potential compliance issue is indicated. A visual indication of any potential compliance issues can be provided.

In another method, a method of a software authoring tool is called to determine user interface controls associated with a software application. Methods associated with the user interface controls are called to determine data sources associated with the user interface controls. The data sources are compared with a library or list of data sources. In a particular implementation, if a data source is in the library, a potential compliance issue is indicated. In another implementation, if a data source is not in the library, a potential compliance issue is indicated. A visual indication of any potential compliance issues can be provided.

The present disclosure also includes computing systems and tangible, non-transitory computer readable storage media configured to carry out, or including instructions for carrying out, an above-described method. As described herein, a variety of other features and advantages can be incorporated into the technologies as desired.

DETAILED DESCRIPTION

Example 1—Overview

Figure 1:
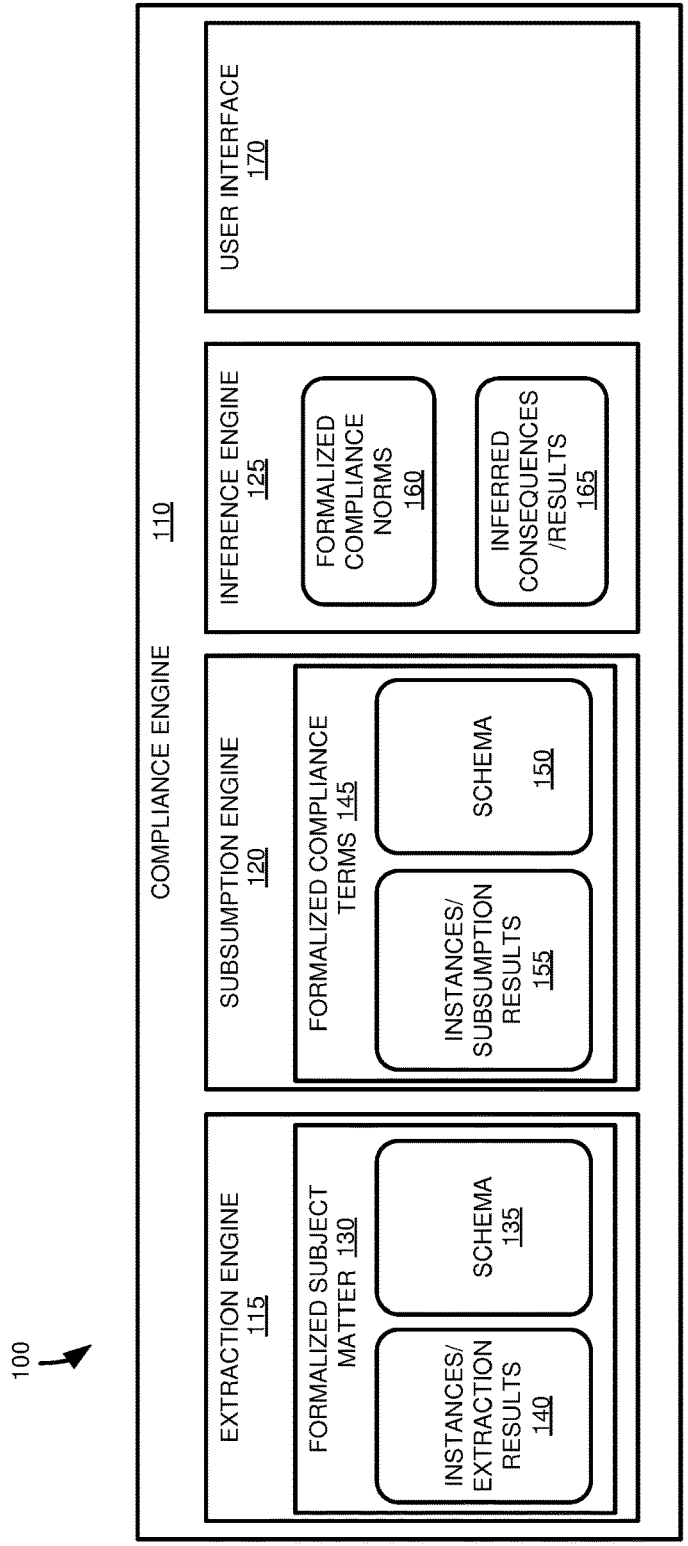
FIG. 1 is a schematic diagram illustrating how a compliance engine can be used to identify in a software program possible sources of noncompliance with a formalized compliance norm according to an embodiment of the present disclosure.

Society is becoming ever more data driven. Companies are able to track their operations at increasing levels of granularity. For individuals, as more and more of their activity takes place, or is tracked, in the digital world, their personal information is often recorded, used, shared, or sold. Even discounting nefarious activities such as hacking, phishing, malware, and viruses, a tremendous amount of information regarding individuals can be gathered through sources such as the websites an individual visits, their actions on the websites, and activity on social networks. Information stored by companies, such as banks, medical providers, and employers, can also be sensitive.

Individuals and governments are increasingly sensitive to the collection and use of personal information. Various laws have been passed to try and specify what information about an individual can be collected, how it can be collected, and how it can be used, shared, or sold. While such laws can be beneficial for individuals, it can be difficult for companies, and particularly the individuals working at companies, to be aware of all the various laws and regulations that might apply to their activities. Even if a company or employee is aware of a law or regulation, laws and regulations can be difficult to understand, and their ramifications may not be clear without additional context. Thus, even companies and employees wishing to comply with relevant laws and regulations regarding the use of personal information may find it difficult to determine whether their actions, or proposed actions, will be legally compliant.

In particular cases, a software developer or programmer may create or modify a software application or program that accesses data that may be subject to legal restrictions or requirements. For example, the program may access health or financial information that is protected by one or more laws or regulations. Although the innovations of the present disclosure are generally described with respect to personal data that may be subject to legal requirements, the innovations can be used with other types of legally protected or regulated information. The innovations can also be used with information that is the subject of some other type of monitoring or scrutiny, such as classified or confidential information of a company.

In some cases, such as when a developer has been working in a particular field for a significant period of time, and the software program under development is tailored to that specific field, a developer may be aware of at least some of the legal or other restrictions surrounding information that may be accessed, processed, or disseminated using the program. However, as laws and regulations are added and evolve, it can be difficult even for legal experts to be fully aware of all the rules that might apply to a particular action. In the case of less experienced developers, or software programs that are not tied to a specific use, the chance of noncompliance further increases.

Given budgets, deadlines, and staffing issues, is may be impracticable for suitably trained individuals, such as a legal expert, to review every software program in sufficient detail before it is released. A legal violation or other noncompliance may not be discovered until the software program is in use. At that point, the company responsible for the software program, and potentially its users, may be subject to liability or other consequences. For example, even if a company is not sued or otherwise subjected to legal proceedings for noncompliance, it can create public relations problems for the company, potentially costing the company customers, revenue, and investment.

The present disclosure provides for the automated identification of potential compliance issues, which can be a compliance issue with a law, regulation, or other legal requirement, or another type of regulation or policy, such as a corporate policy. These sources of potential compliance issues can be referred to as compliance sources, and can be represented as formalized compliance norms constructed from formalized compliance terms, as will be further discussed. A general framework 100 for this automated identification is provided in FIG. 1.

The present disclosure can provide various embodiments of a compliance engine, tool, component, or module 110 that can be used to determine, or assist in determining, whether a potential compliance issue may exist with an activity or proposed activity. The compliance engine 110 can include various components, including an extraction engine 115, a subsumption engine 120, and an inference engine 125. The extraction engine 115 analyzes one or more particular information sources, such as elements of a software program. The extraction results are represented as instances 140 of formalized subject matter 130 adhering to a formalized subject matter schema 135.

The instances 140 of the formalized subject matter 130 can represent the input to, output from, or processing performed by, a software program. The input may be, for example, data sources used by the software. Output may be information displayed or disseminated by the software program. In some cases, a particular type of input, such as a data source, may suggest that an output or use of the data implicates a compliance issue.

In other cases, the inputs to a software program, by themselves, may not be sufficient to reveal potential compliance issues associated with the software program. That is, processing may alter or combine information in a way that raises a potential compliance issue even if the individual data elements or data sources did not. Conversely, the processing may alter or combine information in a way that removes a potential compliance issue associated with one or more of the source data elements or data sources. For example, the health records of a particular individual may be subject to privacy laws or regulations. However, the bulk analysis of the health records of many individuals, stripped from the health records or identifying information of any particular individual, may not give rise to a potential compliance issue.

Some software programs may employ common elements, such as common code segments, data, data structures, methods, user interface elements, and the like. Some software programs may specify inputs (e.g., data sources), outputs (e.g., information output for display or transmitted to another computing device), or processing (e.g., methods, functions, remote procedure calls, application program interface calls) in a similar manner. The extraction engine 115 specifies what elements of the software program may be relevant to a compliance analysis, how to identify, extract, and store such elements.

After instances of the formalized subject matter 140 are extracted and associated with the schema 135, the formalized subject matter instances can be analyzed by the subsumption engine 120. The subsumption engine 120 can attempt to subsume, or relate, instances 140 of the formalized subject matter 130 to one or more formalized compliance terms 145. As an example, the formalized subject matter 130 may include instances of the formalized subject matter term "data" (such as specified in the schema 135), such as individuals' social security numbers stored in personnel files. The extraction engine 115 can specify how to retrieve this information from a software program and map it to the schema 135 to provide instances 140 of the formalized subject matter 130.

The subsumption engine 120 can determine whether a social security number is relevant to any of the formalized compliance terms stored in, or otherwise associated with, the subsumption engine, such as using the schema 150. For example, the formalized subject matter term of "personal data" (an instance of which may be a social security number) may be associated with a formalized compliance term used in determining compliance with one or more laws, regulations, or policies. In a particular example, the subsumption engine 120 can associate the instances 140 of the formalized subject matter 130 with particular compliance terms using a schema 150 to provide instances 155 of the formalized compliance terms (also referred to as subsumption results). The instances 155 can be stored by the subsumption engine 120.

The instances 155, or subsumption results, can be processed by the inference engine 125. The inference engine 125 can analyze the subsumption results 155 to determine whether they may raise any compliance issues using formalized compliance norms 160 stored by, or otherwise associated with, the inference engine 125. The formalized compliance norms 160 may be one or more rules or sets of conditions that determine the likelihood and nature of a compliance issue. For example, the formalized compliance norms 160 may determine a compliance result 165 (e.g., "lawfulness") based on the presence of, and relationship between, various formalized compliance terms 145.

The formalized compliance norms 160 may be, for example, laws, regulations, other legal requirements, corporate policies, other types of compliance sources, or combinations thereof. In some cases, the formalized compliance norms 160 can be defined, or otherwise provided by, a domain expert, such as a legal expert. The domain expert can, e.g., formalize a norm that defines and relates various formalized compliance terms. The domain expert can, for example, define a norm graph that defines and relates various entities (e.g. formalized compliance terms), such as objects and concepts, that may be relevant to a formalized compliance norm. That is, a formalized compliance norm 160 can be described using formalized compliance terms 145. The formalized compliance norms 160 can also include rules or definitions for determining the likelihood or presence of a potential compliance issue. For instance, the formalized compliance norms 160 can specify one or more of when a compliance issue will arise, is likely to arise, could arise, is not likely to arise, or will not arise.

In the example of a social security number, the social security number may be associated with a formalized subject matter term "data" by the extraction engine 115. The extraction engine 115 may determine that this instance of data is also associated with the formalized subject matter term "external transmission." The subsumption engine 120 may subsume these formalized subject matter instances within the formalized compliance term of "transmission to third parties." The inference engine 125 can determine what compliance scenarios or norms (e.g., particular laws, regulations, policies, etc.) are implicated by, or contain, "transmission to third parties."

The inference engine 125 can determine, such as in relation to other elements of the subsumption results 155 (such as any processing performed on the social security numbers or other information transmitted along with the social security numbers) whether a compliance issue may exist. In some cases, the inference engine 125 can provide a determination of whether or not a compliance issue may exist. In other cases, the inference engine 125 may provide an indication of whether a compliance issue may exist, such as highlighting, or another visual indication, formalized compliance terms that may be of concern.

A user, such as through a user interface 170, may be provided with inferred compliance consequences or results 165. The inference results 165 can include information regarding the subsumption results 155 and relevant formalized compliance norms 160 in order for the user to make a final determination of whether a software program is compliant (or, whether the software program should or can be executed in its current form, or if changes should be made in order to improve compliance).

In some cases, information regarding the formalized compliance norms 160 can be provided to assist the user in analyzing a potential compliance issue. For example, by selecting an inference result 165, a user may be presented with information regarding a particular law, regulation, policy, etc. relating to the potential compliance issue. The information can include the relevant text, or an explanation or analysis of the text, associated with the compliance source, which may be useful for the user in understanding how the functionality of the software program may give rise to a compliance issue. In some implementations, the user interface 170 may present a user with suggested actions to address any potential compliance issue.

Example 2—Example Compliance Analysis

Figure 2:
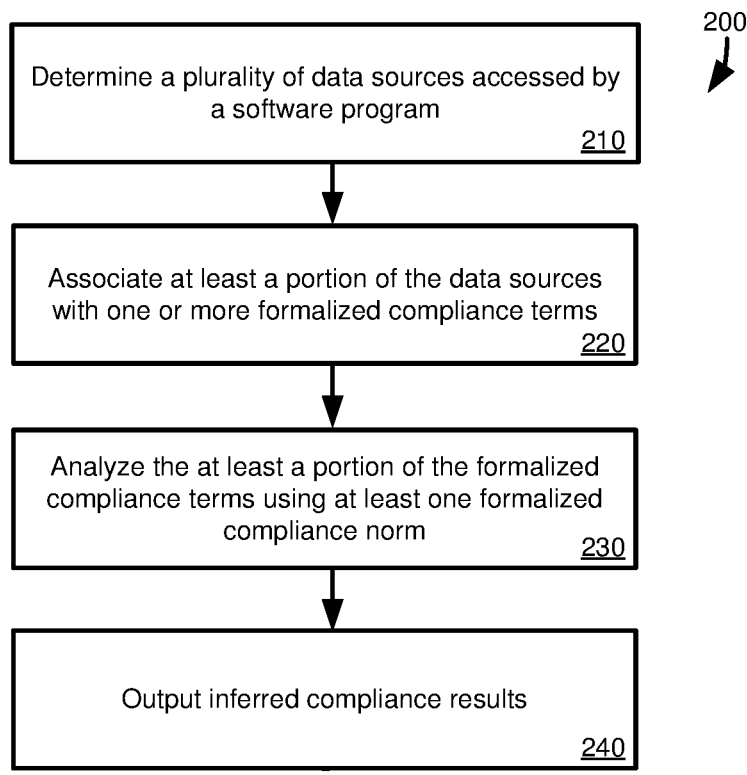
FIG. 2 is a flowchart of a method for analyzing at least a portion of data sources accessed by a software program using at least one formalized compliance norm associated with data sources associated with at least one formalized compliance term associated with the at least one formalized compliance norm.

FIG. 2 illustrates a flowchart of an example method 200 for carrying out a compliance analysis, such as using the framework 100 of FIG. 1. At 210, a plurality of data sources accessed by a software program are determined. In some cases, additional, or other, types of instances of formalized subject matter associated with a software program can be determined. The formalized subject matter instances can include instances of data elements and data objects associated with the software program and processes carried out by the software program, including user input receivable by the software program and output operations performable by the software program, such as transmission of data over a network, printing operations, and displays that may be generated by the software program.

At 220, at least a portion of the data sources (and/or instances of other types of formalized subject matter) is associated with one or more formalized compliance terms. In some cases, a compliance term can be a particular aspect of a particular compliance norm. At least a portion of the formalized compliance terms (and/or instances of formalized subject matter) are analyzed using at least one formalized compliance norm at 230 to provide inferred compliance results. For example, formalized compliance terms associated with the formalized compliance norms can be analyzed to determine whether a compliance norm is, or potentially may be, violated, which could lead to a compliance issue. The inferred compliance results are output at 240.

Example 3—Example Ontology and Formalized Subject Matter

Figure 3:
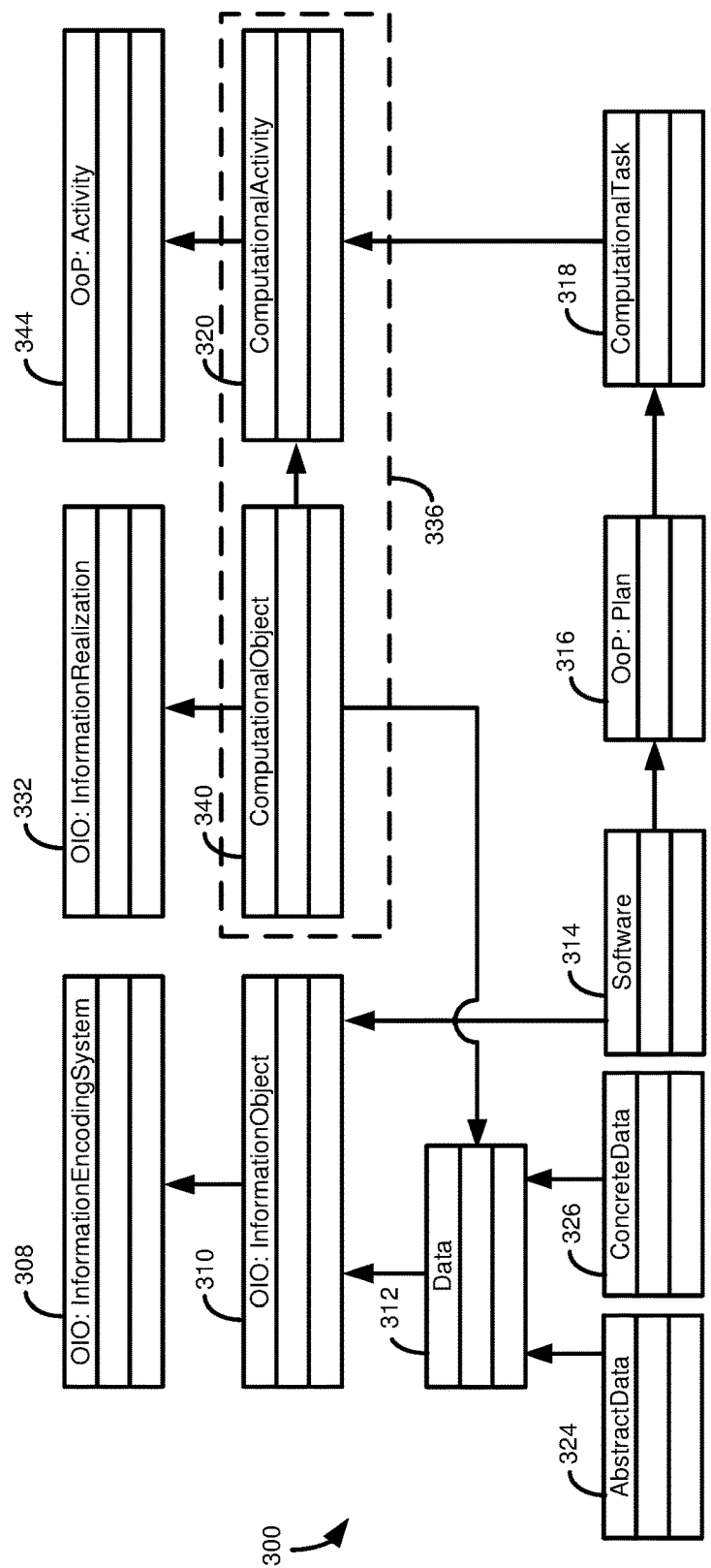
FIG. 3 is a diagram schematically depicting an ontology describing relationships between ontological elements associated with the execution of a software program.

FIG. 3 schematically depicts an example ontology 300. The ontology 300 can be used, for instance, in the extraction engine 115 of FIG. 1, such in (or as) the schema 135. The ontology 300 is provided to help illustrate automated compliance determination, but should not be considered limiting in any way. That is, the specific components of the ontology 300, and their interrelation, may differ from that shown in FIG. 3. In addition, in at least some cases, the formalized subject matter 130 of the extraction engine 115 need not be in an ontology, or otherwise have the format shown in FIG. 3. It should be appreciated that the ontology 300 is presented as an aid for understanding the present disclosure. In practice, the ontology 300, or another representation of formalized subject matter, would normally be stored in a computer-executable format, such as code implementing the objects and relationships shown in the ontology 300.

Elements of the ontology 300 can be aligned under a set of foundational ontologies. The foundations ontologies include an Ontology of Information Objects (OIO), an Ontology of Plans (OoP), and a Descriptive Ontology for Linguistic and Cognitive Engineering (DOLCE). InformationObjects can be entities that exist in an information or computing system, as opposed to analog entities. The Ontology of Plans can be used to provide a theory of plans, generally, that can be used to characterize planning concepts, including modelling workflow information.

A member of the OIO can be InformationEncodingSystem 308, which can be used to order InformationObjects 310. For instance, the encoding of a particular class in C++ can be an InformationObject 310. The InformationObject 310 may be ordered by (e.g., the OIO:orderedBy operation) the C++ programming language, a particular InformationEncodingSystem 308. In turn, InformationObjects 310 may include Data 312 or Software 314. Software 314 can be an InformationObject 310 that expresses a Plan 316 under the OoP ontology. The Plan 316 may define a ComputationalTask 318, that in turn sequences a Computational Activity 320.

Data 312 may present information that can be manipulated, but which does not express a plan. That is, unlike Software 314, Data 312 does not direct computing activities, but rather may be the subject of computing activities. Data 312 can include AbstractData 324 and ConcreteData 326. AbstractData 324 can be data that identifies something other than itself, such as the identity of an individual. In at least some cases, AbstractData 324 (e.g., personal information of an individual) can be subject to laws, regulations, policies, or other compliance sources that may result in compliance issues. An example of ConcreteData 326 can be, for example, integers that can be manipulated (e.g., subject to mathematical operations), such as by a program.

Another element of the Ontology of Information Objects is InformationRealization 332, which can be produced by the results of a ComputationalDomain 336 formed by the interaction of a ComputationalObject 340 with a ComputationalActivity 320. The ComputationalActivity 320 can be a member of the Activity class 344 of the Ontology of Plans. A ComputationalObject 340 can represent the realization of code by execution of the code on (or embedded in) physical computing hardware. In at least some cases, ComputationalObjects 340 can also be classified as PhysicalEndurants under the DOLCE ontology, as, for example, they can be stored in a persistent storage medium (e.g., hard disk) or reside in memory.

A ComputationalObject 340 can be an instance of a class (or other object) that can be interpreted and executed by a CPU. ComputationalObjects 340 may not include, for example, a program, code, or code elements (e.g., classes or objects) that are stored (digitally or by analog means (e.g., written on paper)), or exist as an abstract concept, but are not actively running programs (e.g., programs or code in execution). ComputationalObjects 340 can realize Data 312. For example, Data 312 can serve as input or output to a ComputationalActivity 320.

A ComputationalActivity 320 can represent a running computing system, resulting from the execution of a ComputationalObject 340. A ComputationalActivity 320 can represent software as manifested by a series of computational steps, such as altering variables, receiving input, outputting information, interacting with input/output devices, and the like.

As explained above, the ontology 300 is provided by way of example only. However, the ontology 300 demonstrates how elements of the ontology can be mapped to particular instances of formalized subject matter to help determine whether a compliance issue may exist. For instance, a rule can be developed that indicates that compliance should be further investigated if a program is found to access AbstractData 324 (such as personal information, including the formalized compliance term AbstractData 324 occurring with other instances of formalized compliance terms). Or, a rule can be defined that states that compliance should be further investigated if a program is found to access AbstractData 324 (or, certain types of AbstractData, such as AbstractData that may be personal information) and a ComputationalActivity 320 of transmitting the AbstractData is identified, such as by subsuming instances of formalized subject matter elements under a compliance term (such as "transmission to third parties"). In another case, a subsumption process may result in compliance needing not to be further investigated, such as if the program accesses AbstractData 324, but a ComputationalActivity 320 manipulates the AbstractData in a way that removes potential compliance issues (such as by aggregating the data or removing identifying information). For instance, the ComputationalActivity 320 may prevent formalized subject matter instances of AbstractData 324 from also being subsumed under a formalized compliance term of "ProtectedData."

Example 4—Example Formalized Compliance Terms and Formalized Compliance Norms

Figure 4:
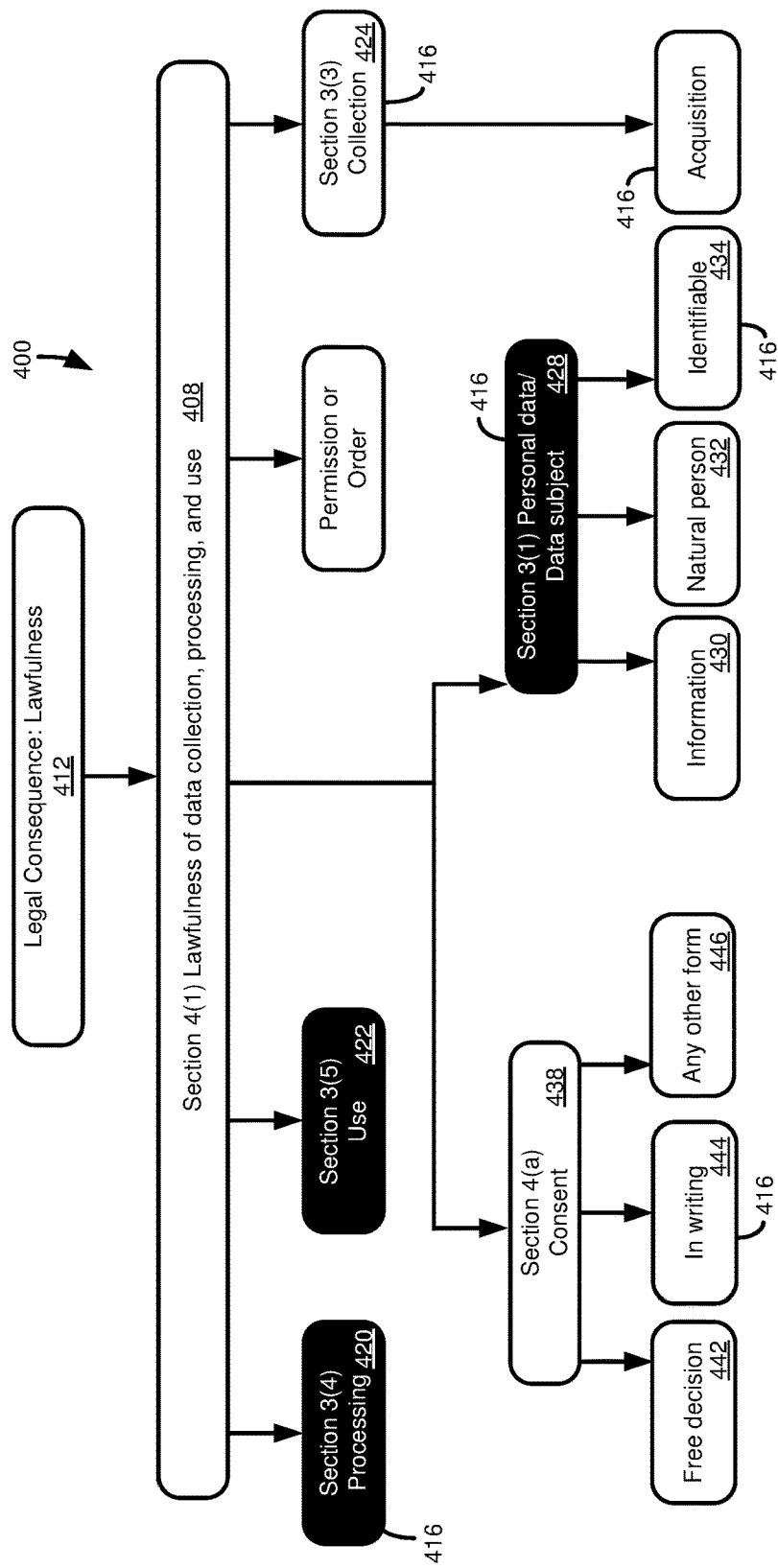
FIG. 4 is a norm graph illustrating the relation of formalized compliance terms associated with a formalized compliance norm.

FIG. 4 illustrates elements of an example formalized compliance norm 400. The formalized compliance norm 400 is a particular law or regulation 408 regarding the lawfulness of collection, processing, and use of personal data. The ultimate outcome of the formalized compliance norm 400 may be a determination of a legal consequence 412, which can be whether an activity or proposed activity (such as an activity carried out at least in part using a software program) is lawful.

The law or regulation 408 can be parsed into a number of constituent elements 416, which may be formalized compliance terms. At least a portion of these formalized compliance terms 416 can be used to subsume instances of formalized subject matter in a schema or ontology, such as the ontology 300 of FIG. 3. While, in at least some cases, inputs to, outputs from, and processing performed by a software program (collectively referred to as program information) can be directly evaluated with respect to the formalized compliance terms 416 of the formalized compliance norm, it may be advantageous to map the instances of the formalized subject matter to a schema or ontology, and then determine whether the schema elements (and their associated instances) can be subsumed under a formalized compliance term.

For example, the program information can be mapped to an ontology (representing formalized subject matter), which in turn may be subsumed under one or more formalized compliance terms. In turn, the formalized compliance terms can be analyzed using one or more formalized compliance norms to infer whether a potential compliance issue may exist. Thus, the program information can have a single mapping to the schema, rather than having to be mapped to multiple, individual formalized compliance terms or formalized compliance norms, which may use different terminology. In addition, mapping the program information to a schema or ontology can allow for greater extensibility, as formalized compliance terms and formalized norms can be added to an analysis simply by defining the appropriate subsumption schema and rules for evaluating the formalized compliance terms using the formalized compliance norm.

Returning to FIG. 4, law or regulation 408 can include formalized compliance terms representing one or more definitions. In some cases, a definition can be supplied by the law or regulation 408 itself. In other cases, the definition can be supplied from another source, such as another legal resource or a legal expert. As an example, FIG. 4 includes a definition 420 for "processing." In this example, definition 420 is supplied by Section 3(4) of the law or regulation 408. The definition may provide details about what kind of actions may constitute the kind of processing that is or is not covered by the law or regulation 408, or which may or may not give rise to a compliance issue. In at least some implementations, a definition, such as the definition 420, can be used to subsume one or more elements of formalized subject matter, such as through a schema or ontology. For example, "processing" may be associated with instances of formalized subject matter associated with the ComputationalTask 318 or ComputationalActivity 320 elements of the ontology 300 of FIG. 3. Similarly, the formalized compliance norm 400 can include definitions (formalized compliance terms 416) for "use" 422 and "collection" 424.

A formalized compliance term 416 providing a definition can, in some cases, be parsed into multiple subelements, or otherwise related to other formalized compliance terms. Definition 428 relates to the definition of personal data or a data subject (e.g., an individual associated with, such as identifiable from, personal data). The definition 428 has subelements of information 430, natural person 432, and identifiable 434. In some cases, subelements can be additional definitions provided by the law or regulation 408. In other cases, subelements can represent definitions provided by another authority or expert, or can represent particular elements that should be considered in determining whether a compliance issue may exist.

In a specific example, information 430 may be "information concerning the personal or material circumstances of an identified or identifiable individual (the data subject)." Thus, program information, instances of formalized subject matter, may not meet the definition of formalized compliance term 428 if the information does not relate to "personal or material circumstances." The definition of formalized compliance term 428 also may not be met if the information does not relate to a natural person, such as if the information relates to an entity (such as a corporation), a group of individuals, or relates to non-human subject matter.

Even if the information relates to "personal or material circumstances" and a "natural person," in order for a compliance issue to potentially be raised by the formalized compliance norm 408, information must still relate to "an identified or identifiable individual." Thus, for example, if salary data was retrieved from a database, for either a group of individuals or a particular individual, that information would not give rise to a potential compliance issue unless the name, social security number, or similar identifying information was also program information (and, even then, further analysis of the program information may reveal other reasons why a compliance issue is not raised).

Formalized compliance terms of the law or regulation 408 can, alone or in combination, be relevant to the determination of whether a compliance issue may exist. For example, in the context of the collection, processing, and use of personal data, an otherwise prohibited or regulated activity may be permitted (or regulations or restrictions removed) if the relevant individual (or another authorized person) provides "consent" 438. Instances of formalized subject matter (or program information) can be mapped to these types of formalized compliance terms 416 as well. For instance, a ComputationalObject 340 might be a class that implements a consent form, or an instance of Data 312 might be a consent flag indicating whether consent has been obtained, and this formalized subject matter subsumed under the "consent" formalized compliance term 438. Thus, rules can be defined where the presence of "consent" 438 indicates that a compliance issue is not raised, but the absence of consent indicates a potential compliance issue, or that further analysis should be undertaken.

A formalized compliance term 416 can be related to other formalized compliance terms. For example, "consent" 438 may include, or be related to, a formalized compliance term 442 representing whether consent was a free decision of the individual, a formalized compliance term 444 representing when consent should be in writing, and a formalized compliance term 446 specifying circumstances is which written consent may not be required. One or more of the formalized compliance terms 442, 444, 446 may be used to subsume formalized subject matter, such as through a schema or ontology, or directly to program information, and the formalized compliance terms evaluated using one or more rules to determine whether a compliance issue may exist. In some cases, an instance of formalized subject matter may be subsumed under more than one formalized compliance term. For example, an electronic indication of consent may be related to both "consent" 438 and "any other form" 446.

As discussed above, all or a portion of the formalized compliance terms 416 can be used to subsume program information, including indirectly through formalized subject matter. In some cases, all or a portion of the mapped formalized compliance terms 416 can be automatically analyzed using one or more rules (representing one or more formalized compliance norms) to determine whether a potential compliance issue may exist. After the automatic analysis, a user may be provided with analysis results, optionally including a determination of whether a compliance issue is likely, additional considerations for evaluating a potential compliance issue, or potential actions to mitigate potential compliance issues.

In some cases, the potential relevance of all or a portion of the formalized compliance terms 416 to a potential compliance issue may be left for a user to determine. That is, in some cases, rules need not be provided, or rules provided such that an analysis of one or more formalized compliance terms 416 is performed, but an ultimate conclusion (e.g., whether or not a compliance violation exists) is not reached. A user may thus be provided with information about the program information and how it relates to the formalized compliance norm 400, from which the user can then manually determine the likelihood of a compliance issue.

Even in cases where no rules are provided, and a user manually determines the impact of program information subsumed under formalized compliance terms 416, presenting the results of the subsumption (in the format shown in FIG. 4 or some other format) can provide advantages. For example, formalizing the law, regulation, or policy giving rise to a potential compliance issue can make it easier for a user, particularly a user who is not a legal expert regarding the compliance issue, to understand how the formalized compliance terms 416 ultimately impact the compliance decision 412. Similarly, by subsuming program information (including through formalized subject matter, such as using a schema or ontology) under the formalized compliance terms 416, the user is altered to which elements of program information are associated with particular components (e.g., formalized compliance terms 416) of the formalized compliance norm 400, which can identify and narrow down the issues the individual need analyze to make their determination of whether a compliance issue is raised.

In some cases, all or a portion of the formalized compliance norm 400 can be presented to a user, such as on a display. The user may, for example, be able to view the relevant text, or an analysis or discussion of the text, of the formalized compliance norm 400 by selecting (e.g., clicking) one of the formalized compliance terms 416. Selection of a particular formalized compliance term 416 can result in a display of other content, such as one or more rules relating to the element, an analysis of one or more rules relating to the element, or a display of program information mapped to the element (optionally including an intermediate mapping to an ontology).

When presented in a display, information associated with the formalized compliance norm 400 can be presented with visual indications of the status of the formalized compliance terms 416, and the overall consequence 412. For example, formalized compliance terms 416, such as terms 420, 422, 428, under which program information has been subsumed, or which are associated with a particular rule or rule element that indicates a compliance issue may be present, may be presented in a first visual style, such as a first color. Formalized compliance terms 416, such as terms 412, 424, 430, 432, 434, 438, 442, 444, 446, that are not present, or which are associated with a particular rule indicating that a compliance issue is not present (or, at least not indicating that the issue is present), can be presented in a second visual style, such as a second color.

Formalized compliance terms 416 that have not been determined (for example, program information has been subsumed under a formalized compliance term, but a determination cannot be made (such as because other formalized subject matter needed for a subsumption operation is not present), or it cannot be determined whether program information can be subsumed under the formalized compliance term) can be presented in a third visual style, such as a third color. In this way, a user may quickly identify areas of potential safety or concern, and, optionally select formalized compliance terms 416 that are unresolved or of potential concern.

Formalized compliance norms can be used to create rules that determine whether a compliance issue may exist. For example, a rule associated with FIG. 4 might be expressed as:

((Collection(X) OR Processing (X) or Use(X))
AND
performedUpon (X,Y) AND Personal Data (Y))
AND
(Permission(P) OR Order (P)) AND givenFor (P,X))
OR
(Consent (C) AND Data Subject(D) AND about (Y,D)
    AND gives (D,C) AND permits (C,X))
→
Lawfullness(A) AND givenFor(A,X)

Where X, Y, P, C, D, and A are variables that represent instances of the relevant formalized compliance term. For example, X can represent a particular collection and D can represent a particular data subject (e.g., an individual). These rules and relations can be implemented in code, and the variables instantiated with particular values associated with a particular software program.

Figure 5:
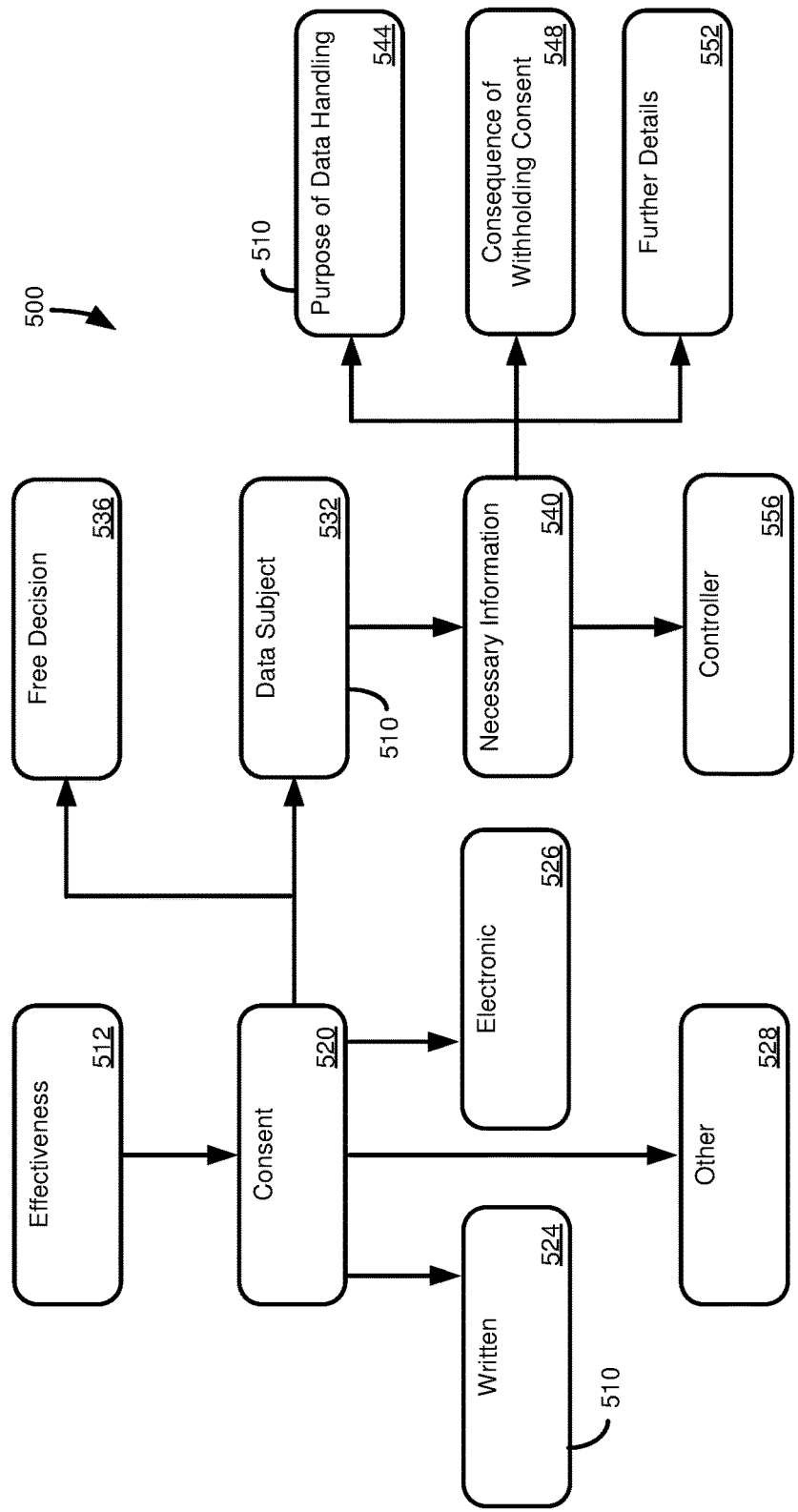
FIG. 5 is a norm graph illustrating additional details of formalized compliance terms associated with FIG. 4.

FIG. 5 presents an example view of a formalized compliance norm 500 (including component formalized compliance terms 510) that may represent, for example, more detailed, granular, or alternative information that may be presented to a user regarding the formalized compliance norm 400 of FIG. 4. For instance, the formalized compliance norm 500 may be presented when a user selects one of the formalized compliance terms 416 of FIG. 4. In particular, the formalized compliance norm 500 may represent a display presented to a user after user-selection of the "consent" term 438.

The formalized compliance norm 500 may include a plurality of formalized compliance terms 510, at least some of which may be, or be related to, one or more of the formalized compliance terms 416 of FIG. 4. In particular, "consent" term 520 may be, or be related to, "consent" term 428. The formalized compliance norm 500 may represent, for example, whether "consent" term 520 is effective, or otherwise capable of negating a potential compliance issue. The formalized compliance norm 500 may include a conclusion or outcome 512, such as whether consent has been given or whether consent is effective.

Determining whether consent exists, or is effective, may be based on a form in which consent has potentially been given. For example, it may be possible for consent to be given in written form 524, electronic form 526, or some other form 528 (e.g., visual, verbal). Whether "consent" 520 is valid may also be determined based on who the consent was potentially given by, and under what circumstances. For instance, the formalized norm 500 indicates that consent 520 should be provided by the data subject 532 (instead of, for example, an agent, guardian, parent, spouse, or the like). Formalized compliance norm 500 also indicates that consent 520 is determined based on whether the consent was a free decision 536 (as opposed to consent given under duress or compulsion).

FIG. 5 indicates additional conditions that must be met (e.g., formalized compliance terms 510 that must be present) for effective consent. The data subject 532 may need to be provided with, and understand, predicate, necessary information 540. For example, the data subject 532 may need to be informed of the purpose of the data handling 544, the consequences of providing or not providing consent 548, and any further details 552 that may be relevant to whether the data subject 532 should provide consent. In some cases, the necessary information 540 can be supplied by a controller 556.

As with the display of the formalized compliance norm 400 of FIG. 4, in at least some cases, a user may be able to obtain additional information regarding the formalized compliance norm 500 by selecting (e.g., clicking on) one of the formalized compliance terms 510. The additional information presented may include one or more of whether program information has been subsumed under the formalized compliance term 510, the relation of the formalized compliance term to one or more compliance rules, or relevant text, or a discussion of the relevant text, of a compliance source associated with the formalized compliance norm 500. Also similarly to the norm 400, a display of the formalized compliance norm 500 can display formalized compliance terms 510 in different visual styles (e.g. colors), depending on whether a formalized compliance term 510 has program information subsumed under it, is associated with a rule, or may or may not be associated with a potential compliance issue.

The views presented in FIGS. 4 and 5 can be interactive. For example, as indicated above, the compliance terms 416, 410 can have a status. In some cases, a user may wish to alter the status of a compliance term 416, 510. For example, for terms 416, 510 that were initially unknown, the user can select to alter the term status (such as by clicking on the term). The view can then change based on the user input, such as by updating other terms 416, 510, or changing a compliance conclusion associated with the graph. The user can update the view as the user attempts to gain compliance for a program, thus interactively updating the view to learn whether the software is compliant, terms 416, 510 that still give rise to noncompliance, or information on actions needed to reach compliance.

Example 5—Example Program Information

Figure 6:
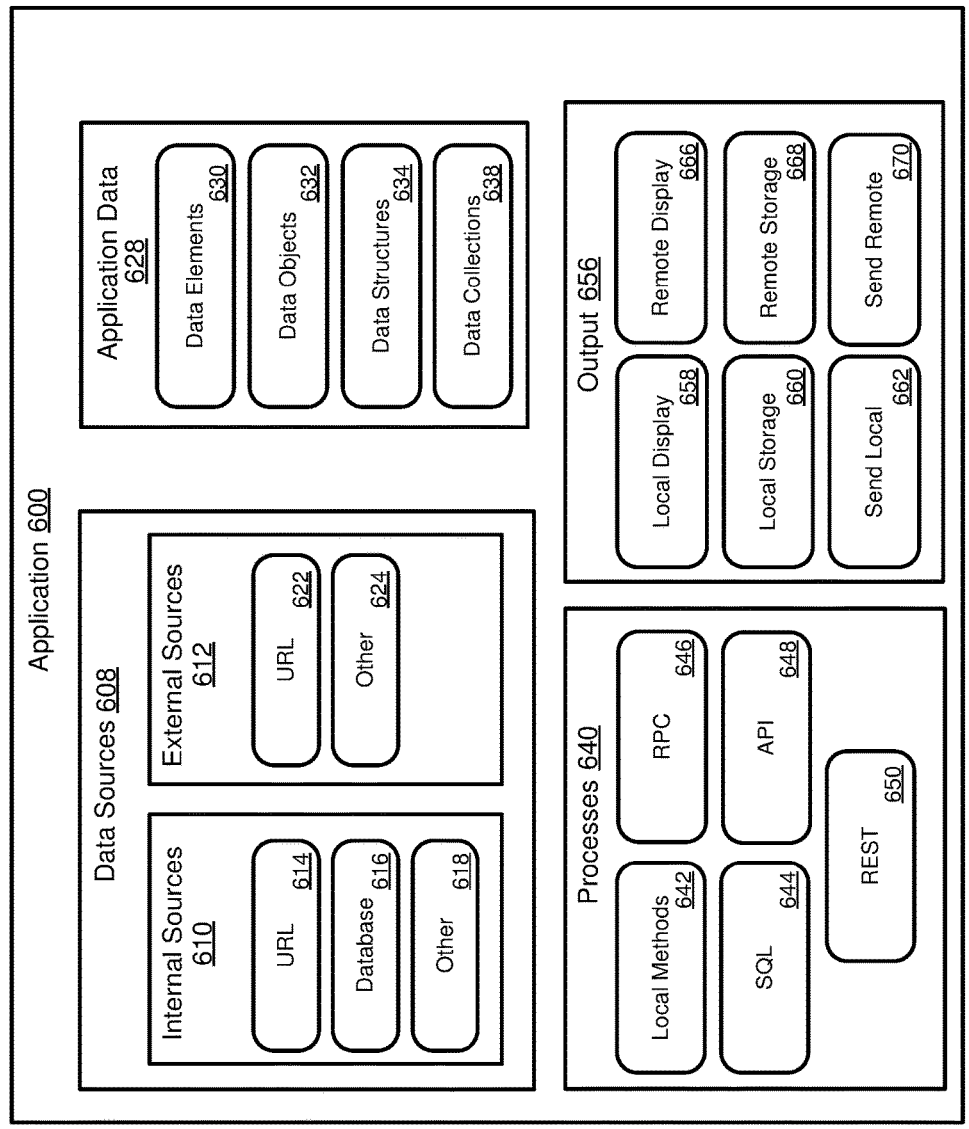
FIG. 6 is a block diagram illustrating components of a software application according to an embodiment of the present disclosure.

As discussed above, program information (e.g., input to, output from, and processing performed by a software program) can be evaluated in view of a formalized compliance norm to determine whether a compliance issue may exist. FIG. 6 is a schematic diagram of a program or application 600 illustrating potential sources of program information (which can be directly associated with formalized compliance terms or processed to provide instances of formalized subject matter, such as being mapped to a schema or ontology, and then subsumed under the formalized compliance terms).

The application 600 can include data sources 608. The data sources 608 can include internal data sources 610 and external data sources 612. Internal data sources 610 can include data sources accessible through URLs 614, data maintained in a database 616, and other data sources 618. Other data sources 618 can be, for example, data stored in memory associated with the application 600 or in persistent storage (e.g., a hard disk) accessible by the application.

External data sources 612 can include resources available through URLs 622 or other data sources 624. Other external data sources 624 can be, for example, data maintained on another computing system, such as in persistent storage or a database of the other computing system, which may be accessed by the application 600, such as using network requests.

In some cases, data can be identified as possibly giving rise to a compliance issue depending on whether it is from an internal data source 610 or an external data source 612. For example, it may be known that internal data sources 610 will not give rise to compliance issues. Or, internal data sources 610 can be classified or labelled as to whether they may give rise to a compliance issue, or otherwise be associable with one or more formalized compliance norms. Certain tables or records may be known to include personal data, such as income, social security numbers, medical data, or the like, which may give rise to compliance issues if handled improperly. The internal data sources 610 can be mapped to formalized subject matter in some cases.

In some aspects, external data sources 612, or particular types of external data sources, can be flagged as potentially giving rise to a compliance issue, or otherwise associated with one or more formalized compliance norms (such as being represented as formalized subject matter instances and then subsumed under formalized compliance terms). It can be more difficult to know whether information obtained from an external data source 612 may give rise to a compliance issue. For example, if the application 600 is allowed to access external URLs 622, it may be difficult to predict what kind of information may be received. Thus, in some implementations, all information from an external data source 612, or particular types of information (e.g., information from URLs 622 or particular URLs) be may flagged as potentially giving rise to a compliance issue, mapped to formalized subject matter, which in turn may be mapped to (subsumed under) one or more formalized compliance terms associated with a formalized compliance norm, and optionally rules, to determine whether a compliance issue may exist.

Knowing the data sources 608 used by an application may not be sufficient to determine whether a compliance issue may exist. For example, data may be maintained in an aggregated form that could lead to a compliance issue, but may be processed or output in a way that reduces or eliminates potential compliance issues. Conversely, data may be maintained in a way that does not, by itself give rise to a compliance issue, but could be manipulated into a form that could give rise to a compliance issue. While names and social security numbers, maintained in separate tables, may not give rise to a potential compliance issue, when combined, the resulting data may give rise to a compliance issue.

Accordingly, in some aspects, application data 628 can be evaluated in determining potential compliance issues. Application data 628 can represent data generated from the data sources 608 during execution of the application 600, or otherwise associated with the application. Application data 628 can include individual data elements 630 (e.g., variables, records), data objects 632 (e.g., a collection of variables or records, such as abstract data types (e.g., classes)), data structures 634 (e.g., queues, lists, heaps, stacks, binary search trees, graphs, and the like), and other types of data collections 638.

To illustrate how information from the data sources 608 that may give rise to a compliance issue can be used by the application in a way that does not give rise to a compliance issue, consider an internal data source 610 that includes records for individuals, with each record including the individual's name, social security number, and medical history. Aspects of the medical history, such as the performance of a particular medical procedure, are stored as data elements 630, but not the name or social security number of the corresponding individual. Thus, the application data 628 is not likely to give rise to a potential compliance issue, even though the data sources 608 included information that could give rise to a potential compliance issue.

In the opposite scenario, the name, social security number, and medical history of individuals may be stored in the internal data source 610 as individual elements. If the elements were combined by the application into a data object 632, the data object may give rise to a potential compliance issue even if the information in the internal data source 610 did not. Without analyzing the application data 628 and the data sources 608, a potential compliance issue may go undetected. Subsumption can be used to determine whether program information (including as instances of formalized subject matter) can be associated with a formalized compliance term, which in turn can be evaluated using rules for a formalized compliance norm to determine whether a potential compliance issue may exist.

Application data 628 can affect a compliance analysis in other ways. Application data 628 may indicate circumstances that increase or decrease the probability of a compliance issue. Using the example of personal data that can be collected and used with consent, a data element 630 (or other type of application data 628) can be associated with consent. Examples of data elements 630 that can be associated with consent include consent forms or variables representing whether consent has been given, such as a flag or Boolean variable. In some cases, consent can be collected by the application 600, such as in response to user input (e.g., clicking a consent user interface element indicating that they granted consent).

Processes 640 carried out by the application 600 may also be analyzed to determine whether a software program is likely to result in a compliance issue. As discussed above, information can be processed such that it is more or less likely to give rise to a compliance issue. Various types of processes can be analyzed, including local methods 642 (e.g., methods associated with abstract data types, such as classes), SQL operations 644 or other database operations, remote procedure calls 646, application program interface calls 648, and REST operations 650.

One or more of the processes 640 can be subsumed under a formalized compliance term and/or other program information (including through subsumption of the processes 640 as represented as instances of formalized subject matter), to be analyzed in making a compliance determination. For instance, the combination of an internal data source 610 representing a personal record associated with a local method 642 performing a disaggregation operation may be associated with reduced compliance risk for a formalized compliance norm (e.g., it may no longer be subsumed under a required formalized compliance term).

Output 656 associated with the application 600 may also be used in determining potential compliance issues. While certain formalized compliance norms may be associated with data collection, or data processing, others may be concerned with information dissemination. Output 656 can include information output for local display 658, which could be on a screen or a printer, information stored on local storage 660 (e.g., local persistent storage, such as a hard disk or flash memory), or information sent locally 662. Information sent locally can include information sent within a local computing system, such as a company intranet.

Output 656 can also include remote output, such as on a remote display 666, storage on remote storage 668, or remotely sent data 670, such as data sent to a remote or external computing system. Remote display 666, storage 668, or sending 670 can include actions such as providing access to the information via the internet, including posting the information to a social networking site, a blog, or a public internet site (including a corporate website made available to external users).

In some cases, determining whether a compliance issue may exist based on a formalized compliance norm can depend on the nature of the output 656, including whether the output is external or internal. In the case of personal data, output 656 output remotely may generally be more likely to give rise to a potential compliance issue. Program information in the form of output 656 can be combined with other types of program information in determining whether a compliance issue may exist. For example, a rule can be defined (such as using a formalized compliance term) whereby information from a particular data source 608, when sent remotely 670, may give rise to a potential compliance issue, but the information does not give rise to a potential compliance issue if not output or output in another manner.

Example 6—Example Compliance Determination

Figure 7:
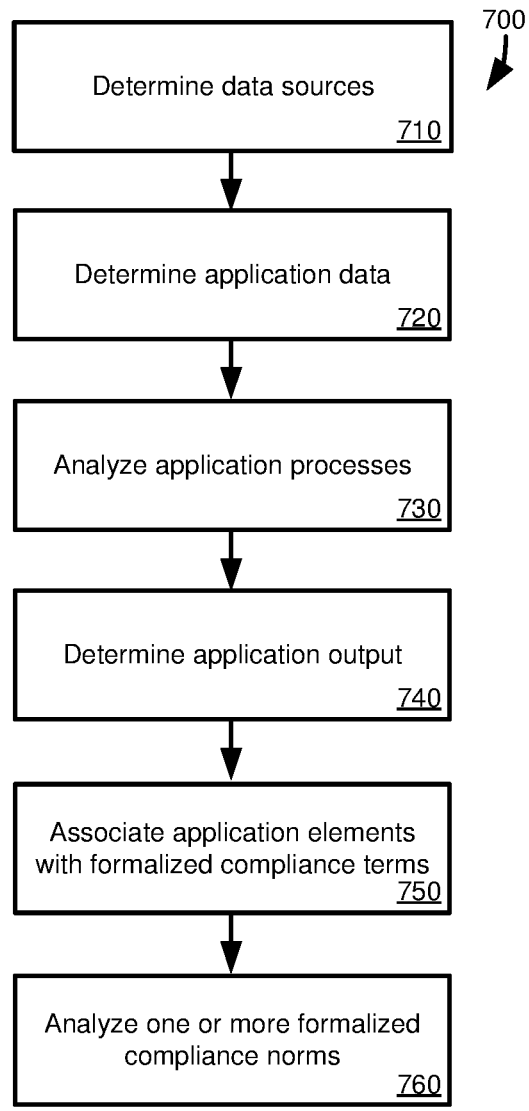
FIG. 7 is a flowchart of a method for determining whether a software application raises a potential compliance issue with respect to one or more formalized compliance norms by analyzing elements of the software application.

FIG. 7 illustrates a flowchart of an example method 700 for carrying out a compliance analysis, such as using the framework 100 of FIG. 1 and a software application 600 structured as shown in FIG. 6. At 710, a plurality of data sources of the application are determined. Application data associated with the application (e.g., data elements, data objects, data structures, or data collections) are determined at 720. At 730, processes carried out by the application (e.g., using local methods or remote methods) are analyzed. Analyzing the processes can include determining the effect of the processes on the data sources determined at 710 or the application data determined at 720. For instance, the processes may be analyzed to determine whether they affect a mapping between the data sources or application data and a formalized compliance term, or a mapping between the data sources or application data and one or more formalized compliance norms.

At 740 application output is determined, such as whether data from the application is sent or displayed remotely or locally. In some cases, determining application output at 740 can include analyzing the application output to determine the effect of the output on data sources determined at 710 or application data determined at 720, including the effect on the data sources or application data in view of the processes analyzed at 730. For example, the output may be analyzed to determine whether it affects a mapping between the data sources or application data and a formalized compliance term, or a mapping between the data sources or application data and one or more formalized compliance norms.

At 750, application elements or program information (e.g., data sources associated with the application, application data, application processes, or application output) are associated with formalized compliance terms. For instance, data sources potentially associated with protected personal information may be identified as critical data sources. A critical data source can be a data source that may give rise to a compliance issue. As described above, in particular aspects, how data from data sources or data elements are processed or output can affect how they are mapped to formalized compliance terms. Protected personal information that is not output, or is processed to remove identifying information, may no longer be considered a critical data source. At 760, one or more formalized compliance norms are analyzed using the formalized compliance terms determined at 750.

Example 7—Example Software Architecture

Example 5 generally described how program information of a general application 600 (which in turn can be represented as instances of formalized subject matter) can relate to a formalized compliance norm (including its component formalized compliance terms) to determine potential compliance issues. In a specific embodiments, the application 600 can be a mobile application, a web based application, or a mobile web based application. A mobile application can be a software program configured to run on a mobile computing device, such as a smartphone or tablet computing device. A web-based application can be a program configured to run in a web browser.

Figure 8:
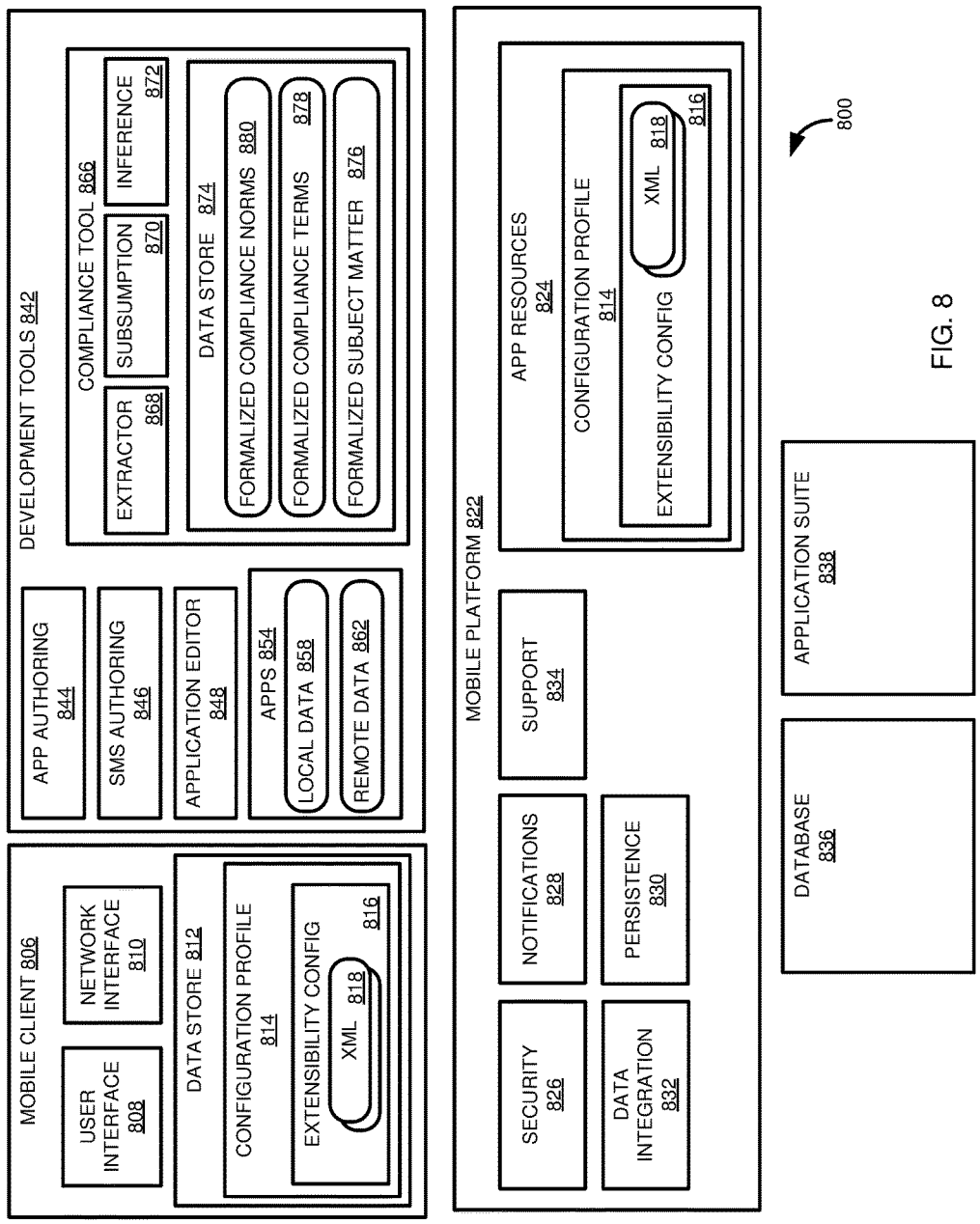
FIG. 8 is a block diagram illustrating an example software architecture in which a mobile client, a mobile platform, and development tools can interact in executing a compliance tool to assist in determining whether a software application raises potential compliance issues.

FIG. 8 illustrates an example software architecture 800 in which one or more of the disclosed innovations may be implemented. The architecture 800 can include a mobile client 806. The mobile client 806 can be a smartphone, tablet computing device, or other type of mobile computing device. The mobile client can include a user interface 808 that can be used to present information to, and receive input from, a user. A user interface 808 can thus include functionality for presenting information on a display device, and receiving information from one or more user input devices (e.g., a touchscreen, style, microphone, etc.). A network interface 810 can allow the mobile client 806 to communicate with other computing systems or devices, including other components of the architecture 800. In other aspects, rather than including a mobile client 806, the architecture 800 can include a client, more generally (e.g., for desktop web based applications or other types of client applications).

In some cases, the mobile client 806 can include a data store 812. The data store 812 can store various types of information, including information regarding applications executable on the mobile client 806. The applications may be, in specific examples, an application structured as described for the application 600 of FIG. 6. The applications can be associated with a configuration profile 814 stored in the data store 812. The configuration profile 814 can include information used in executing a particular application, such as external resources (e.g., data sources or computing resources) accessed by the application, images that may be displayed using the application, and presentation and layout information. In a particular example, the configuration profile can be an APPLICATION CONFIGURATION PROFILE of the MOBILE APPLICATION WORKBENCH of SAP SE, of Walldorf, Germany.

A particular element of the configuration profile 814 can be an extensibility configuration 816, which can specify how an application is extended or augmented relative to a base platform (e.g., a base application or configuration). The extensibility configuration 816 can include one or more XML files 818 that can specify, among other things, data sources, including external data sources, that may be accessed by the application. For example, a XML file 818 may provide a model that binds data sources to controls associated with the user interface 808. A XML file 818 may also include information regarding web service invocations carried out by an application (including to external web services) or data types used by the application.

In a specific example, program information useable to determine a potential compliance issue can be retrieved from the application configuration profile 814, including from an XML files 818 of the extensibility configuration 816. For example, data sources specified by the XML files 818 can be retrieved.

Resources associated with an application executable on the mobile client 806 can be maintained on a mobile platform 822 instead of, or in addition to, being maintained at the mobile client. For example, the mobile platform 822 can include an application resources store 824 that includes the application configuration profile 814, the extensibility configuration 816, and one or more XML files 818. In a specific example, the mobile platform 822 can be the SAP MOBILE PLATFORM of SAP SE, of Walldorf, Germany.

The mobile platform 822 can provide additional functionality. For example, the mobile platform 822 may provide various services to the mobile client 806, and an application executing thereon. Example services can include security services 826 (e.g., user authentication services), a notifications service 828 (e.g., push notifications), a persistence service 830 (e.g., to store data associated with an application executed in association with the mobile client 806), a data integration component 832 (e.g., to mediate access to various data sources), and support services 834. Support services 834 can provide for capturing errors, traces, log events, and performance, as well as managing and monitoring application features.

The mobile platform 822 can be in communication with other components of the architecture 800, such as to provide services (e.g., the services 826, 828, 830, 832, 834, among others) to a mobile application. For example, data can be obtained from, or stored in, a database 836. In a particular implementation, the database 836 can be the HANA database of SAP SE, of Walldorf, Germany. The mobile platform 822 can also be in communication with additional applications, such as an application suite 838, which can help provide the services of the mobile platform, or provide additional services. In a particular implementation, the application suite can be the S/4 HANA application suite of SAP SE of Walldorf, Germany.

In some cases, the mobile platform 822 can assist in deploying, executing, and managing applications. A set of development tools 842 can be provided for creating or editing new applications, including applications running in conjunction with the mobile platform 822. The development tools 842 can include an application authoring tool 844. The application authoring tool 844 can provide an integrated development environment for creating and managing the application. The application authoring tool 844 can, for example, provide for developing user interface controls and creating a data model binding the controls to relevant data, as well as navigating between screens and allowing for programming to provide additional or more complex functionality. Relevant data can include external data sources, such as data sources whose access is mediated by the mobile device platform 822 during execution of the application.

The development tools 842 can also include a SMS application authoring tool 846. The SMS authoring tool 846 can be used to incorporate SMS (short message service) functionality into mobile applications. In at least some cases, the SMS authoring tool 846 may also use the services of the mobile platform 822 for developed application, along with application components developed using the application authoring tool 844.

An application editor 848 can be provided. The application editor 848 can be used to modify aspects of an application, such as without having to recompile the code. In a specific example, the application editor 848 can be an ECLIPSE (The Eclipse Foundation, Ottawa, Ontario, Canada) based editor, such as the MOBILE APPLICATION WORKBENCH of SAP SE, of Walldorf, Germany. The application editor 848 can allow a user to carry out functions such as changing the language used in the application, altering data bindings, and altering style and layout information. In particular implementations, the application editor 848 can modify such information through XML files. The application editor 848 can be used, in a specific example, to create or edit the application configuration profile 814 discussed above, including extensibility information 816, which can include information stored in an XML file 818.

The various components of the development tools 842 or, optionally other components (e.g., other IDEs, programming tools, compilers, or SDKs) can be used to produce one or more application(s) 854. As discussed above, the applications 854 can include local 858 or remote 862 data sources.

The development tools 842 can further include a compliance tool 866. The compliance tool 866 can include an extractor components 868, a subsumption component 870, and an inference component 872, corresponding at least generally to the extraction engine 115, the subsumption engine 120, and the inference engine 125 of FIG. 1. In the particular example of FIG. 8, including where an application for a mobile devices is to be analyzed for potential compliance issues, the extractor component 868 can retrieve data sources accessed by the application. For example, the extractor component 868 can retrieve information about the local data sources 858 and remote data sources 862 accessed by the mobile application. In some aspects, the extractor component 868 can analyze the code of the application to extract program information (including data sources). In particular examples, the program information can be mapped as instances of formalized subject matter, such as using a schema or ontology.

In a particular case, data sources accessed by the application can be retrieved by analyzing data sources bound to a user interface control. The user interface controls can be maintained in a list, accessed using a function (e.g., a class method, API, or similar interface), or through some other method. Once the user interface controls are identified, they can be checked for bindings to data sources, and the data sources extracted by the extractor component 868. In a specific example, user interface controls and any associated bindings can be automatically extracted by the extractor component 868 using an API of the application authoring tool 844, such as using a first API to obtain a list of user interface controls and the using an API or similar function to obtain information regarding any data sources used by (e.g., bound to) each user interface control.

In another particular case, information about data sources used by a mobile application can be obtained by the extractor component 868 from configuration information associated with the mobile application, such as information stored in the configuration profile 814, including the extensibility configuration 816 and the XML files 818. In some cases, the XML file 818 can store information about what data is retrieved (such as particular instances of a class or other object), regardless of the specific source from which the data is retrieved. The XML file 818 may also specify collections of data object instances used by the application (which can be of the same or different types). An example of binding information for an OData source can be:

```
<binding bindingId = "SalesOrders" type="collection">
    <parameter parameterID = "cname">SalesOrder</parameter>
</binding>
```

Where SalesOrder specifies a collection of data objects (e.g., instances of an abstract data type representing individual sales orders).

In some cases, one data item can refer or relate to another data item. These relationships can be used to identify data items accessed by the application. Data items can have a directional relationship, such as a parent-child or forward-backward relationship. In general, a relationship can be defined as an object (or other data item) serving as the reference or source object and an object (or other data item) serving as the related object. In an XML file 818, an example relational binding for an OData data source can be:

```
<binding bindingId = "SalesOrderItem" type = "relation">
    <parameter parameterId = "entity">$current</parameter>
    <parameter parameterID = "relation">items</parameter>
</binding>
```

A SalesOrder data object can thus be bound to SalesOrderItems, which can be individual products associated with a sales order. Similarly, an "Account" data object may be associated with one or more "Contact" data objects (e.g., individuals associated with a particular account).

Configuration information, including configuration information expressed in an XML file 818, can include queries (e.g., database SQL operations) that are accessed by an application. An example query configuration binding for an OData data source can be:

```
<binding bindingID = "Sample" type = "query">
    <parameter parameterID = "cname">Customer</parameter>
    <parameter parameterID = "filter>substring(zipcode, 1, 2) eq
'69'</parameter>
    <parameter parameterID = "top">10</parameter>
</binding>
```

The information regarding data sources accessed by an application can be stored in a data store 874 of the compliance tool 866. For example, the information regarding data sources can be stored as instances of formalized subject matter 876. The instances of formalized subject matter 876 associated with an application can then be processed by the subsumption component 870. Data sources accessed by the application can be analyzed to determine whether they can be subsumed under any formalized compliance terms 878 stored in the data store 874 and accessible by the subsumption component 870.

At least certain data sources or other instances of formalized subject matter 876 can be mapped to one or more of the formalized compliance terms 878 directly, or indirectly using a schema or ontology. Mapping the instances of formalized subject matter 876 to formalized compliance terms using the subsumption component 870 can help ensure that terminology differences in the sources of formalized subject matter (e.g., user interface controls or data bindings from an XML file 818 or other component of the application configuration profile 814) are harmonized in conducting a compliance analysis (e.g., harmonized to a common schema/ontology, which is then mapped to formalized compliance terms). Information regarding instances of the formalized subject matter, such as a name of a data source (or particular data from the data source) and an identifier (e.g., a particular URL associated with the data) can be attached to an ontology or schema element as part of the operation of the extractor component 868. In turn, the information can be attached to any formalized compliance terms into which the instances are subsumed by the subsumption component 870.

After the data sources or other formalized subject matter 876 has been processed by the subsumption component 870, the subsumption results can be analyzed by the inference component 872. For example, the inference component 872 can apply one or more compliance rules related to formalized compliance norms 880 of the data store 874 (e.g., relationships between formalized compliance terms) to the subsumption results to determine whether a compliance issue may exist. The compliance tool 866 can provide information regarding any potential compliance issues to a user (e.g., using the user interface 808 of the mobile client 806), such as using the example displays of FIG. 4 or 5.

The architecture 800 can include more or fewer components than shown, and may be organized in other manners. For example, functionality of a particular component can be carried out by another component. In addition, in at least some cases, functionality can be carried out using multiple components. In a specific example, all or a portion of the functionality of two or more of the mobile client 806, the development tools 842, the mobile platform 822, the database 836, or the application suite 838 may be combined.

Figure 9:
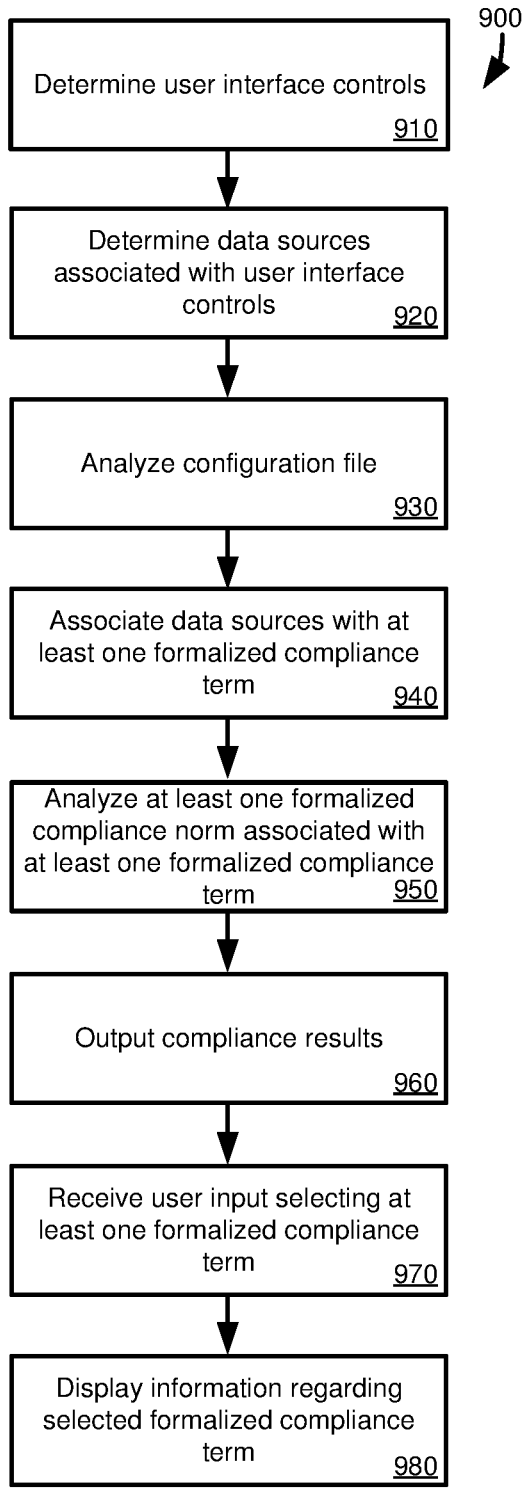
FIG. 9 is a flowchart of a method for presenting to a user compliance information obtained by analyzing user input controls and a configuration file to obtain information regarding data sources associated with a software application.

Example 8—Example Compliance Analysis Using User Interface Controls and Configuration File FIG. 9 illustrates a flowchart of an example method 900 for carrying out a compliance analysis using user interface controls and a configuration file, such as the using the architecture 800 of FIG. 8. In specific examples, the method 900 can be used with a mobile application, a web based application, or a web based mobile application.

At 910, user interface controls associated with the application are determined. For example, the user interface controls can be determined using an API of an application authoring tool, such as the application authoring tool 844 of FIG. 8. Data sources associated with the user interface controls are determined at 920. In a specific case, methods associated with the data sources can be called to get the data sources associated with the user interface controls.

At 930, a configuration file associated with the application is analyzed to determine data sources associated with the application, such as data objects instances or collections of data object instances. In a particular example, step 930 includes parsing a XML file to determine data sources associated with the application.

At 940, data sources associated with the application (e.g., data sources determined at 920 and 930) are associated with at least one formalized compliance term. In some cases, the data sources can be associated with a formalized subject matter element, and the formalized subject matter element associated with a formalized compliance term. In other cases, the data sources can be directly associated with a formalized compliance term of a formalized compliance norm. In yet further cases, the data sources can be directly associated with a formalized compliance norm. At 950, at least one formalized compliance norm is analyzed, the formalized compliance norm being associated with at least one of the formalized compliance terms associated with a data source at 940. In a particular example, analyzing the formalized compliance norm includes determining whether or not a data source, or a particular type of data source, is present. Compliance results, such as whether a potential compliance issue may exist, are output at 960.

At 970, user input is received. The user input selects at least one formalized compliance term associated with the compliance results. In response to the user input, at 980, information is displayed to the user regarding the selected formalized compliance term. The information may include data sources associated with the formalized compliance term, text of a formalized compliance norm associated with the formalized compliance term, analyses of a formalized compliance norm associated with the formalized compliance term, whether the selected formalized compliance term is associated with a potential compliance issue, possible remedial action to address any potential compliance issues associated with the selected formalized compliance term, or combinations thereof.

Example 9—Computing Systems

Figure 10:
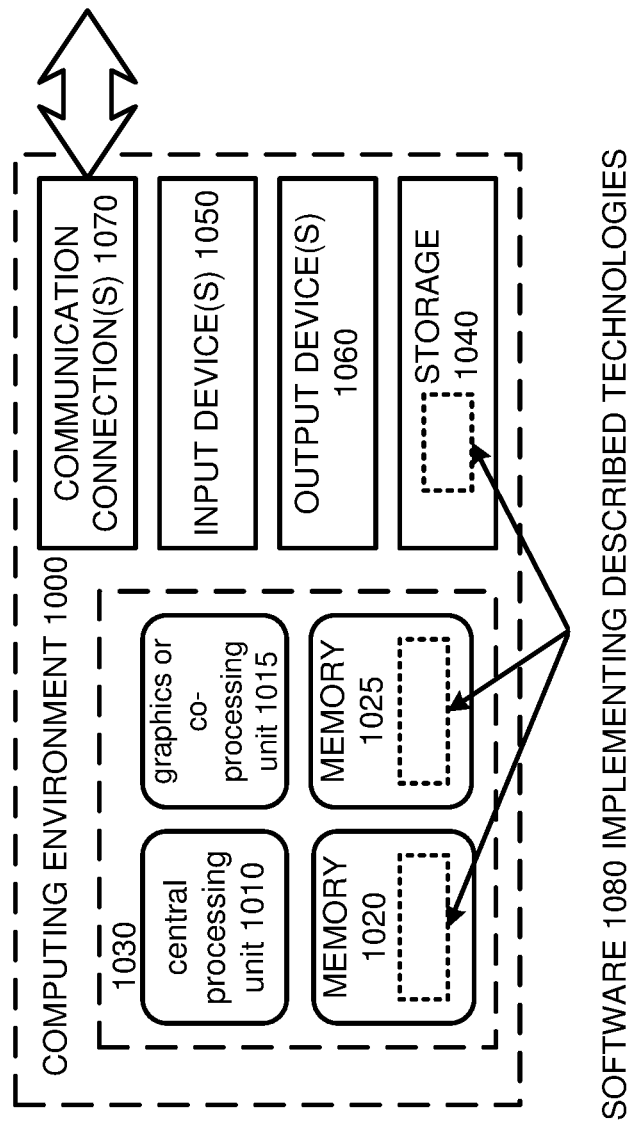
FIG. 10 is a diagram of an example computing system in which some described embodiments can be implemented.

FIG. 10 depicts a generalized example of a suitable computing system 1000 in which the described innovations may be implemented. The computing system 1000 is not intended to suggest any limitation as to scope of use or functionality of the present disclosure, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing components of the framework 100 of FIG. 1 or the architecture 800 of FIG. 8, including the extractor component 868, the subsumption component 870, and the inference component 872. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015. The memory 1020, 1025, may also store database data, such as data associated with the database 836 of FIG. 8.

A computing system 1000 may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10—Cloud Computing Environment

Figure 11:
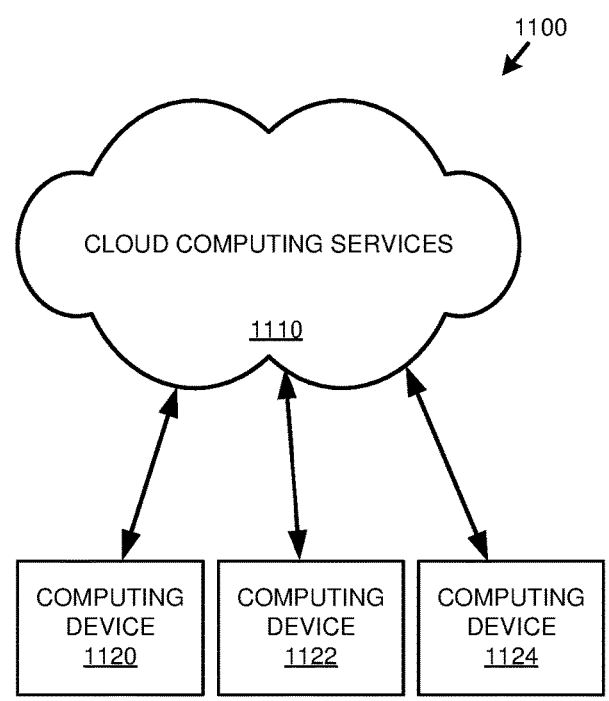
FIG. 11 is an example cloud computing environment that can be used in conjunction with the technologies described herein.

FIG. 11 depicts an example cloud computing environment 1100 in which the described technologies can be implemented. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operations (e.g., data processing, data storage, and the like).

Example 11—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 10, computer-readable storage media include memory 1020 and 1025, and storage 1040. The term computer-readable storage media does not include signals and carrier waves. In addition, the term computer-readable storage media does not include communication connections (e.g., 1070).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. One or more non-transitory computer-readable storage media storing computer-executable instructions for causing a computing system to perform processing to analyze whether a software program may create a compliance issue, the processing comprising:
    automatically determining, with a compliance tool specified by the computer-executable instructions, a plurality of data source identifiers corresponding to data sources accessed by the software program, the automatically determining comprising:
        analyzing a configuration file of a software program for data binding information, the data binding information indicating data source identifiers associated with respective data sources;
        determining a plurality of user interface controls associated with the software program; and
        determining data source identifiers for data sources bound to at least one of the plurality of user interface controls;
    automatically associating at least a portion of the plurality of data source identifiers with one or more formalized compliance terms using the compliance tool, the automatically associating comprising:
        comparing the at least a portion of the data source identifiers with a collection of data source identifiers;
        determining whether one or more of the plurality of data sources identifiers correspond to critical data sources based on comparing respective data source identifiers of the plurality of data sources identifiers with the collection; and
        analyzing the at least a portion of the data source identifiers with the compliance tool using at least one formalized compliance norm comprising at least one of the one or more formalized compliance terms to provide compliance results; and
    outputting to a user the compliance results.

2. The one or more non-transitory computer-readable storage media of claim 1, wherein determining a plurality of user interface controls comprises calling a method of a software program authoring tool.

3. The one or more non-transitory computer-readable storage media of claim 2, wherein determining data source identifiers for data sources bound to at least one of the plurality of user interface controls comprises calling methods associated with the data sources, the method returning identifiers for data sources bound to the respective user interface controls.

4. The one or more non-transitory computer-readable storage media of claim 1, wherein a data source identifier of the plurality of data source identifiers is associated with a data source selected from a data object, a collection of data objects, or a database query.

5. The one or more non-transitory computer-readable storage media of claim 1, wherein the configuration file comprises a XML file.

6. The one or more non-transitory computer-readable storage media of claim 1, wherein the collection of data source identifiers correspond to a collection of non-critical data sources and wherein determining whether the one or more of the plurality of data source identifiers correspond to critical data sources comprises;
    identifying a data source identifier of the at least portion of the data source identifiers as associated with a critical data source if the respective data source identifier is not in the collection of data source identifiers.

7. The one or more non-transitory computer-readable storage media of claim 6 wherein the collection of non-critical data sources comprises internal resources.

8. The one or more non-transitory computer-readable storage media of claim 6, wherein a critical resource comprises a data source that may contain protected personal information.

9. The one or more non-transitory computer-readable storage media of claim 1, wherein associating at least a portion of the data source identifiers with one or more formalized compliance terms comprises:
    determining data manipulation actions performed on data retrieved from the data sources associated with the at least a portion of the data source identifiers.

10. The one or more non-transitory computer-readable storage media of claim 1, wherein analyzing the at least a portion of the data source identifiers using at least one formalized compliance norm comprises:
    determining data manipulation actions performed on data retrieved from the data sources associated with the at least a portion of the data source identifiers.

11. The one or more non-transitory computer-readable storage media of claim 1, wherein analyzing the at least a portion of the data source identifiers using at least one formalized compliance norm comprises:
determining output operations associated with data retrieved from the data sources associated with the at least a portion of the data source identifiers.

12. The one or more non-transitory computer-readable storage media of claim 1, wherein associating at least a portion of the data source identifiers with one or more formalized compliance terms comprises:
determining output operations associated with data retrieved from the data sources associated with the at least a portion of the data source identifiers.

13. The one or more non-transitory computer-readable storage media of claim 1, wherein the formalized compliance norm is associated with a law, a regulation, or a policy.

14. The one or more non-transitory computer-readable storage media of claim 1, wherein outputting to the user the compliance results comprises displaying to the user a representation of formalized compliance terms associated with the formalized compliance norm, wherein formalized compliance terms potentially associated with a compliance issue are visually indicated to a user.

15. The one or more non-transitory computer-readable storage media of claim 14, the processing further comprising:
receiving user input selecting a displayed formalized compliance term; and
providing the user with text of the formalized compliance norm associated with the formalized compliance term.

16. A computing system that implements a compliance tool, the computing system comprising:
one or more memories;
one or more processing units coupled to the one or more memories; and
one or more non-transitory computer readable storage media storing instructions that, when loaded into the memories, cause the one or more processing units to perform operations for:
analyzing a configuration file of a software application for data binding information, the data binding information indicating a plurality of data source identifiers associated with respective data sources;
calling a method of a software application authoring tool to determine user interface controls associated with the software application;
calling methods associated with the user interface controls to determine data source identifiers of data sources associated with the user interface controls;
determining whether the data source identifiers associated with the user interface controls and the configuration file are associated with critical or non-critical data sources;
associating at least a portion of the data source identifiers associated with the user interface controls and the configuration file with one or more formalized compliance terms, the associating based at least in part on whether a respective data source identifier of the at least a portion of the data source identifiers is associated with a critical or non-critical data source;
analyzing the at least a portion of the data source identifiers using at least one formalized compliance norm comprising at least one of the formalized compliance terms; and
outputting for display a visual representation of the formalized compliance norm and associated formalized compliance terms, wherein the visual representation indicates formalized compliance terms that may be associated with a potential compliance issue.

17. The computing system of claim 16, wherein the configuration file comprises a XML file.

18. In a computing system comprising a memory and one or more processors, a method of evaluating a potential compliance issue associated with at least one formalized compliance norm, the method comprising:
analyzing a configuration file of a software application for data binding information, the data binding information indicating a plurality of data source identifiers associated with respective data sources accessed by the software application;
determining a plurality of user interface controls associated with the software application;
determining data source identifiers for data sources bound to at least one of the plurality of user interface controls; and
adding the data source identifiers for the data sources bound to at least one of the plurality of user interface controls to the plurality of data source identifiers determined from the configuration file;
determining whether at least a portion of the data source identifiers determined from the configuration file and the user interface controls are associated with critical or non-critical data source;
associating the at least a portion of the data source identifiers with one or more formalized compliance terms at least in part based on whether a respective data source identifier is associated with a critical or non-critical data source;
analyzing the at least a portion of the data source identifiers using at least one formalized compliance norm comprising at least one of the one or more formalized compliance terms; and
outputting for display a visual representation of the formalized compliance norm and associated formalized compliance terms, wherein the visual representation indicates formalized compliance terms that may be associated with a potential compliance issue.

19. The method of claim 18, wherein the configuration file comprises a XML file.

20. The method of claim 18, wherein analyzing the at least a portion of the data source identifiers using at least one formalized compliance norm comprises:
determining data manipulation actions performed on data retrieved from the data sources associated with the at least a portion of the data source identifiers.

\* \* \* \* \*